(12) United States Patent
Cai et al.

(10) Patent No.: US 10,113,487 B2
(45) Date of Patent: *Oct. 30, 2018

(54) CASCADED MULTI-VARIABLE CONTROL SYSTEM FOR A TURBOSHAFT ENGINE

(71) Applicant: UNITED TECHNOLOGIES CORPORATION, Farmington, CT (US)

(72) Inventors: Chaohong Cai, Weatogue, CT (US); Timothy J. Crowley, Tolland, CT (US); Richard P. Meisner, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1088 days.

This patent is subject to a terminal disclaimer.

(21) Appl. No.: 14/282,544

(22) Filed: May 20, 2014

(65) Prior Publication Data
US 2015/0113996 A1  Apr. 30, 2015

Related U.S. Application Data

(60) Provisional application No. 61/895,108, filed on Oct. 24, 2013.

(51) Int. Cl.
*F02C 9/54* (2006.01)
*F02C 9/28* (2006.01)

(52) U.S. Cl.
CPC ............ *F02C 9/54* (2013.01); *F02C 9/28* (2013.01); *F05D 2220/329* (2013.01); *F05D 2270/052* (2013.01)

(58) Field of Classification Search
CPC ........ F02C 9/16; F02C 9/18; F02C 9/20; F02C 9/28; F02C 9/48; F02C 9/50; F02C 9/52;
(Continued)

(56) References Cited

U.S. PATENT DOCUMENTS 3,516,250 A    6/1970 Moore, Jr.
4,807,129 A *  2/1989 Perks .................... B64C 13/503
                                              244/17.13
(Continued)

OTHER PUBLICATIONS

Walsh, P., Gas Turbine Performance [2004], Blackwell Science Ltd, Oxford UK, 2$^{nd}$ Edition, Chapters 4, 7 and 11.*

*Primary Examiner* — William H Rodriguez
*Assistant Examiner* — Jason H Duger
(74) *Attorney, Agent, or Firm* — Cantor Colburn LLP (57) ABSTRACT

A control system for a gas turbine engine is disclosed. The control system may include a computer processor. The control system may also include an outer loop control module programmed into the computer processor to determine a torque request based at least in part on a real-time collective lever angle command. The control system may also include an inner loop control module programmed into the computer processor to receive the torque request from the outer loop control module, to determine fuel flow and inlet guide vane schedules based at least in part on the received torque request, and to send signals to a gas generator of the gas turbine engine in order to control the gas generator according to the determined fuel flow and inlet guide vane schedules.

22 Claims, 6 Drawing Sheets

(58) Field of Classification Search
CPC .............. F02C 9/54; F05B 2250/411; F05D 2270/052; F05D 2220/329; F02D 2200/1002; F02D 2200/1004; F02D 2200/101; F01D 17/04; F01D 17/06; F01D 21/14; B64C 27/12; B64C 27/18
See application file for complete search history.

(56) References Cited

U.S. PATENT DOCUMENTS

| | | | |
|---|---|---|---|
| 5,189,620 A * | 2/1993 | Parsons | G05B 7/02 318/609 |
| 6,729,139 B2 * | 5/2004 | Desai | B64C 27/001 60/39.281 |
| 6,758,044 B2 | 7/2004 | Mannarino | |
| 6,789,000 B1 * | 9/2004 | Munson, Jr. | F01D 19/00 361/51 |
| 6,879,885 B2 * | 4/2005 | Driscoll | B64C 27/12 416/27 |
| 6,882,889 B2 | 4/2005 | Fuller et al. | |
| 7,513,120 B2 | 4/2009 | Kupratis | |
| 7,777,358 B2 | 8/2010 | Halsey et al. | |
| 8,090,456 B2 | 1/2012 | Karpman et al. | |
| 8,201,414 B2 | 6/2012 | Haehner et al. | |
| 2011/0146232 A1 * | 6/2011 | Westervelt | F02C 5/11 60/247 |
| 2012/0221156 A1 * | 8/2012 | Fuller | G05B 17/02 700/287 |
| 2013/0139518 A1 | 6/2013 | Morgan | |
| 2013/0269363 A1 * | 10/2013 | Lu | F02C 9/54 60/773 |

* cited by examiner

CASCADED MULTI-VARIABLE CONTROL SYSTEM FOR A TURBOSHAFT ENGINE

CROSS-REFERENCE TO RELATED APPLICATION

This is a Non-Provisional Patent Application claiming priority under 35 U.S.C. § 119(e) to U.S. Provisional Patent Application No. 61/895,108 filed on Oct. 24, 2013.

FIELD OF THE DISCLOSURE

The present disclosure is directed generally toward gas turbine engines, and more specifically toward a control system and method for a gas turbine engine.

BACKGROUND OF THE DISCLOSURE

Gas turbine engines typically include a compressor section, a combustor, and a turbine section, arranged in flow series with an upstream inlet and a downstream exhaust. Initially, air flows through the compressor section where it is compressed or pressurized. The combustor then mixes and ignites the compressed air with fuel, generating hot combustion gases. These hot combustion gases are then directed from the combustor to the turbine section where power is extracted from the hot gases by causing blades of the turbine to rotate.

Gas turbine engines may include one or more spools. For example, small-scale engines may generally use a one-spool design with co-rotating compressor and turbine sections, while larger-scale engines may generally comprise a number of coaxially nested spools. The multiple spools may operate at different pressures, temperatures, spool speeds, and directions. For instance, two-spool designs may include a high pressure spool (or high spool) and a low pressure spool (or low spool). The high pressure spool may include a high pressure turbine driving a high pressure compressor, and the low pressure spool may include a low pressure turbine driving a low pressure compressor.

Turboshaft engines, a type of gas turbine engine typically used on helicopters, generally include a third power turbine spool. The power turbine spool may comprise a power turbine that drives an external load, such as a main rotor of the helicopter. Helicopter flight maneuvers, which involve a change in collective pitch, rapidly change the load or power demand on the power turbine. However, in order to achieve ideal handling qualities for the airframe, a constant rotor speed should ideally be maintained when delivering the requested change in power demand on the power turbine.

Accordingly, there exists a need for an engine control system that matches the change in power demand while maintaining a constant rotor speed. This disclosure is directed to solving this need and others.

SUMMARY OF THE DISCLOSURE

According to one embodiment of the present disclosure, a control system for a gas turbine engine is disclosed. The control system may comprise a computer processor; an outer loop control module programmed into the computer processor to determine a torque request based at least in part on a real-time collective lever angle command; and an inner loop control module programmed into the computer processor to receive the torque request from the outer loop control module, to determine fuel flow and inlet guide vane schedules based at least in part on the received torque request, and to send signals to a gas generator of the gas turbine engine in order to control the gas generator according to the determined fuel flow and inlet guide vane schedules.

In another embodiment, the control system may further comprise a load estimation module in communication with the outer loop control module, the inner loop control module, and the gas turbine engine, the load estimation module programmed to generate signals indicative of a real-time estimated power turbine speed and a real-time estimated power turbine torque.

In another embodiment, the outer loop control module may determine the torque request based at least in part on the real-time estimated power turbine speed and a desired power turbine speed.

In another embodiment, the outer loop control module may determine the fuel flow and inlet guide vane schedules based at least in part on the real-time estimated power turbine speed.

In another embodiment, the inner loop control module may determine the fuel flow and inlet guide vane schedules based at least in part on the real-time estimated power turbine speed.

In another embodiment, the outer loop control module may determine the torque request based at least in part on operational inputs.

In another embodiment, the outer loop module may include inversion of a dynamic model of a rotor.

In another embodiment, the inner loop control module may determine stability bleed schedules based at least in part on the received torque request, and send a signal to the gas generator of the gas turbine engine in order to control the gas generator according to the determined stability bleed schedules.

In another embodiment, the inner loop control module includes inversion of a dynamic model of a gas generator.

In another embodiment, the dynamic model of the inner loop control module may be constrained to limits of the gas turbine engine.

In another embodiment, the inner loop control module may determine the fuel flow and inlet guide vane schedules based at least in part on operational inputs.

According to another embodiment of the present disclosure, a method for controlling a gas turbine engine is disclosed. The method may comprise a computer processor receiving a real-time collective lever angle command and a real-time power turbine speed signal; the computer processor generating a torque request based at least in part on the real-time collective lever angle command and the real-time power turbine speed signal; the computer processor generating a fuel flow signal and an inlet guide vane signal based at least in part on the generated torque request; and the computer processor sending the fuel flow signal and the inlet guide vane signal to a gas generator of the gas turbine engine to control a power turbine torque of the gas turbine engine.

In another embodiment, the method may further comprise a sensor detecting a real-time power turbine speed, generating the real-time power turbine speed signal, and sending the real-time power turbine speed signal to the computer processor.

In another embodiment, the method may further comprise a sensor detecting a real-time power turbine torque, generating a real-time power turbine torque signal, and sending the real-time power turbine torque signal to the computer processor.

In another embodiment, the method may further comprise the computer processor generating a stability bleed signal based at least in part on the generated torque request and sending the stability bleed signal to the gas generator of the gas turbine engine to control the power turbine torque of the gas turbine engine.

In another embodiment, the method may further comprise the computer processor using inversion of a dynamic model of a rotor to generate the torque request, and the computer processor using inversion of a dynamic model of a gas generator to generate the fuel flow signal and the inlet guide vane signal.

According to yet another embodiment of the present disclosure, a turboshaft engine is disclosed. The turboshaft engine may comprise a gas generator section; a power turbine section downstream of the gas generator section; and a control system in communication with the gas generator section and the power turbine section. The control system may include at least one computer processor. The at least one computer processor may be configured to: receive a collective lever angle signal and a power turbine speed signal, generate a torque request based at least in part on the collective lever angle signal and the power turbine speed signal, generate a fuel flow signal and an inlet guide vane signal based at least in part on the generated torque request, and send the fuel flow signal and the inlet guide vane signal to the gas generator section in order to control a torque of the power turbine section.

In another embodiment, the computer processor may be configured according to a cascaded architecture.

In another embodiment, the cascaded architecture may include an outer loop control module to generate the torque request and an inner loop control module to generate the fuel flow signal and the inlet guide vane signal.

In another embodiment, the outer loop control module may use dynamic inversion of a rotor model to generate the torque request, and the inner loop control module may use dynamic inversion of a gas generator model to generate the fuel flow signal and the inlet guide vane signal.

In another embodiment, the computer processor may be further configured to generate a stability bleed signal based at least in part on the generated torque request, and send the stability bleed signal to the gas generator section in order to control the torque of the power turbine section.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. It should be understood, however, that there is no intention to be limited to the specific embodiments disclosed, and the intention is to cover all modifications, alternative constructions, and equivalents along within the spirit and scope of the present disclosure.

DETAILED DESCRIPTION

Figure 1:
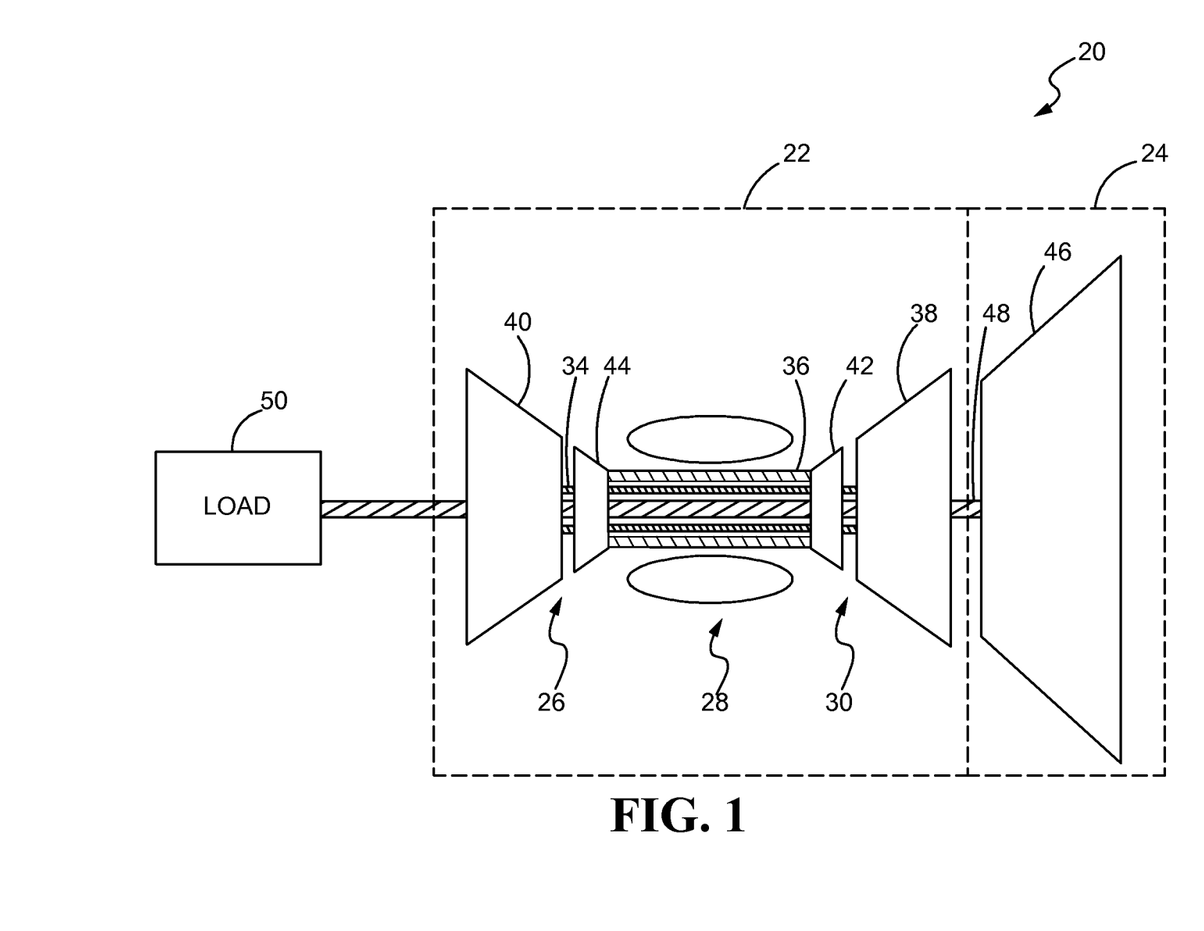
FIG. 1 is a schematic representation of a gas turbine engine, according to one embodiment of the present disclosure.

Referring now to the drawings, and with specific reference to FIG. 1, in accordance with the teachings of the disclosure, an exemplary gas turbine engine 20 is shown. In this example, the gas turbine engine 20 is a turboshaft engine, although other types of gas turbine engines are certainly applicable to this disclosure. The gas turbine engine 20 may be used on an aircraft for generating thrust or power, or in land-based operations for generating power as well.

The gas turbine engine 20 may generally comprise a gas generator section 22 and a power turbine section 24. The gas generator section 22 may include a compressor section 26 where air is pressurized, a combustor 28 downstream of the compressor section which mixes and ignites the compressed air with fuel and thereby generates hot combustion gases, a turbine section 30 downstream of the combustor 28 for extracting power from the hot combustion gases, and an annular flow path 32 extending axially through each.

In this example, the gas generator section 22 comprises a two-spool configuration, particularly, a low spool 34 and a high spool 36. Mounted to the low spool 34 is a low pressure turbine 38 which drives a low pressure compressor 40. Mounted to the high spool 36 is a high pressure turbine 42 which drives a high pressure compressor 44. More or less than two spools may certainly be used in the gas generator section 22.

The power turbine section 24 of the gas turbine engine 20 comprises a power turbine 46 mounted to a power turbine spool 48. The gas generator section 22 generates combustion gas that imparts torque to the power turbine spool 48 through the power turbine 46. The power turbine spool 48 may drive a load 50, such as, without limitation, a rotor, a turbo-pump, an electrical generator, a propeller, or other load. Although not shown, a gear box may multiply the torque or power from the power turbine spool 48 to the load 50.

Referring now to FIGS. 2-5, with continued reference to FIG. 1, a control system 60 for the gas turbine engine 20 is shown, according to an embodiment of the present disclosure. The control system 60 may comprise any non-transitory computer readable storage medium having stored thereon computer-executable instructions, such as, at least one computer processor. As shown best in FIG. 2, the control system 60 may include an outer loop control module 62 in communication with an inner loop control module 64. The outer and inner loop control modules 62, 64 are also in communication with the gas turbine engine 20 and load 50 (e.g., control units and/or sensors of the gas turbine engine 20 and load 50). For example, the control system 60 may include a plurality of sensors operatively connected to the computer processor. The plurality of sensors may be disposed on the gas turbine engine 20 and load 50, generating signals indicative of operating parameters, such as, without limitation, a real-time power turbine speed and a real-time estimated power turbine torque.

Figure 2:
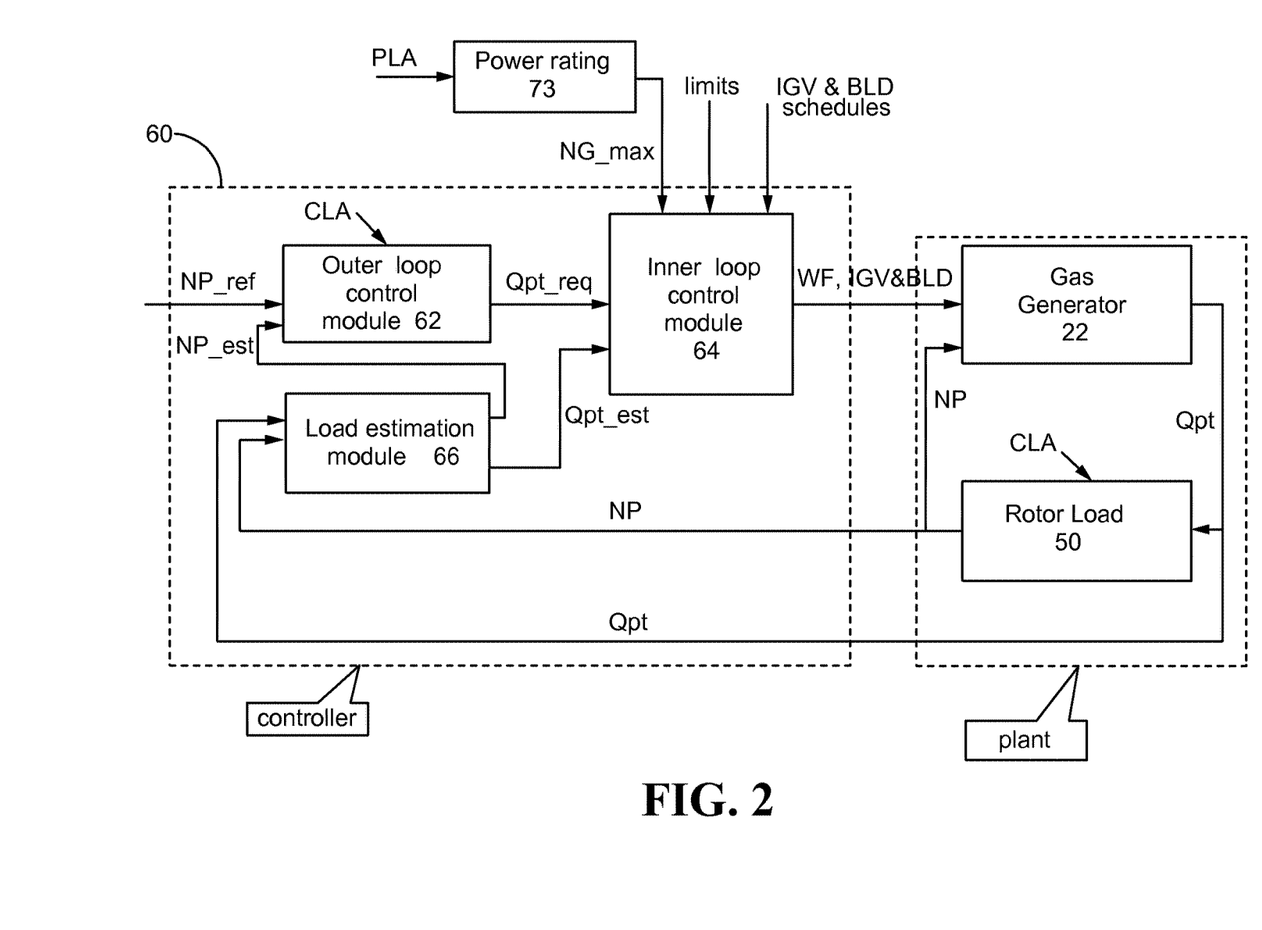
FIG. 2 is a schematic representation of a control system for the gas turbine engine of FIG. 1.

The outer loop control module 62 and the inner loop control module 64 create a cascaded architecture of the control system 60 in order to manage power demand of the gas turbine engine 20 and rotor speed of the load 50. The outer loop control module 62 may be in communication with the load 50, and the inner loop control module 64 may be in communication with the gas generator section 22 of the gas turbine engine 20. In this example, the load 50 is a combination of the power turbine and main rotor of the helicopter, although other loads are certainly possible. The gas generator section 22 and the load 50 are also in communication with each other. In addition, a load estimation module 66 may be in communication with the outer loop control module 62, inner loop control module 64, gas generator section 22, and load 50.

The outer loop control module 62 may receive a signal from the load estimation module 66 indicative of an estimated power turbine speed (NP_est) in real-time. In addition, the outer loop control module 62 may receive a desired power turbine speed (NP_ref) signal and a signal indicative of a collective lever angle command (CLA) in real-time. Based at least in part on the received signals, the outer loop control module 62 determines a torque request (Qpt_req) of the power turbine that will match the estimated power turbine speed (NP_est) in real-time to the desired power turbine speed (NP_ref). In so doing, the outer loop control module may maintain the power turbine at a same rotor speed, or power turbine speed. A signal indicative of the determined torque request (Qpt_req) is then sent from the outer loop control module 62 to the inner loop control module 64.

Figure 3:
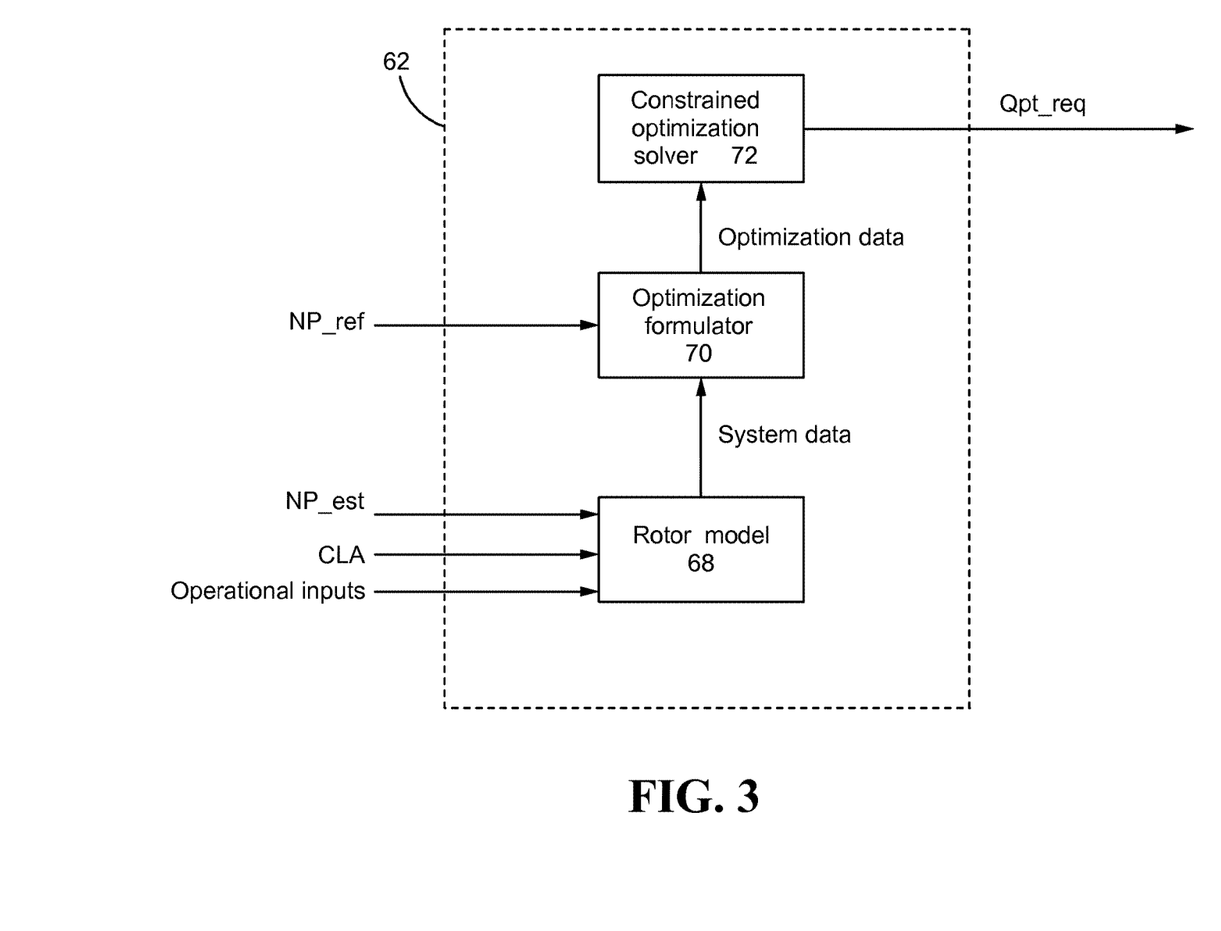
FIG. 3 is a schematic representation of an outer loop control module for the control system of FIG. 2.
Figure 4:
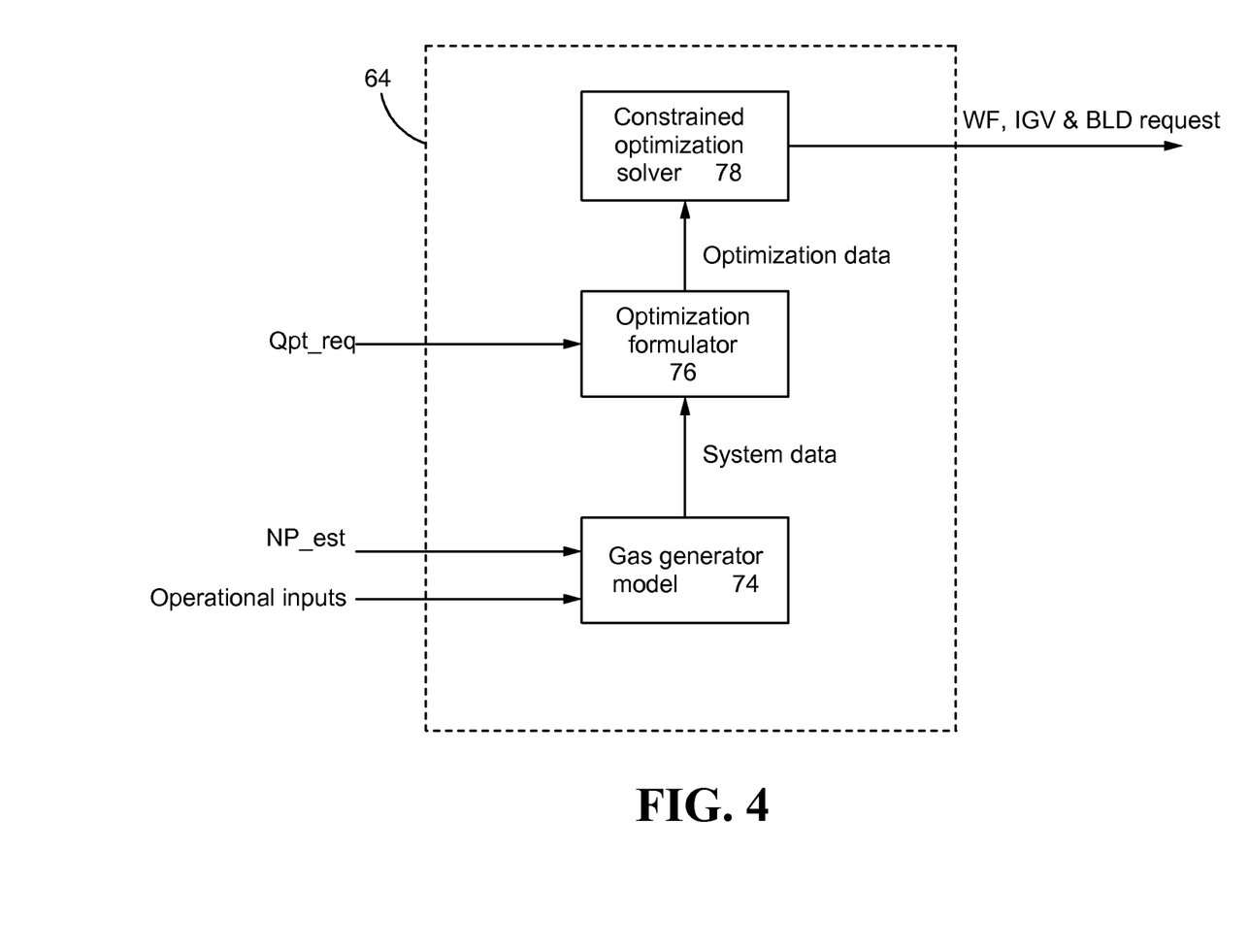
FIG. 4 is a schematic representation of an inner loop control module for the control system of FIG. 2.

In order to generate the torque request, the outer loop control module 62 employs inversion of a dynamic model. For example, as shown in FIG. 3, the outer loop control module 62 may include a rotor model 68, an optimization formulator 70, and a constrained optimization solver 72. The rotor model 68 may model dynamic behavior of the rotor. It is to be understood that the model 68 may apply to other loads than the rotor, such as, without limitation, a turbopump, an electrical generator, a propeller, or the like. The outer loop control module 62 may also employ other methods, such as, proportional integral plus feed-forward control methods.

The rotor model 68 may be a linear or nonlinear (e.g., differential algebraic equations, possibly in numerical simulation form), physics and data-based model based at least in part on the estimated power turbine speed (NP_est) and collective lever angle command (CLA). In addition, the model 68 may be based on other inputs, such as operational inputs or environmental conditions including airframe speed, power turbine speed percentage, collective lever angle percentage, and autorotation mode (e.g., autorotation and autorotation recovery). Optimization formulator 70 may receive model data from the rotor model 68, as well as the desired power turbine speed (NP_ref). Based on those inputs, optimization formulator 70 may formulate an optimization problem for which optimization software will be able to solve as a numerically iterative process in real-time.

Constrained optimization solver 72 may receive optimization data from the optimization formulator 70 in order to generate power turbine torque request (Qpt_req). Constrained optimization solver 72 may be a numerical iteration tool which finds a solution to the optimization problem formulated by optimization formulator 70. In addition, constrained optimization solver 72 may be constrained to certain limits, such as, a torque limit of the power turbine 24. In so doing, the outer loop module 62 utilizes constrained dynamic inversion of the rotor model in real-time to generate the torque request (Qpt_req).

Referring back to FIG. 2, the inner loop control module 64 receives the torque request signal from the outer loop control module 62. In addition, the inner loop control module 64 may receive a signal indicative of an estimated power turbine torque (Qpt_est) in real-time from the load estimation module 66. Other inputs, such as, signals indicative of gas generator speed maximum limit (NG_max), gas turbine engine limits, and inlet guide vane (IGV) and stability bleed (BLD) schedules in real-time may also be received by the inner loop control module 64.

The gas generator speed maximum limit (NG_max) signal may be sent to the inner loop control module 64 from a power rating module 73. Power rating module 73 receives a power lever angle signal (PLA) to generate gas generator speed maximum limit (NG_max) signal. Since gas generator speed is a function of power lever angle, power rating module 73 may utilize tables to generate the gas generator speed maximum limit (NG_max) signal based on the power lever angle (PLA) command.

As used herein, the term "inlet guide vane schedules" may refer to the positioning of the low compressor stator vanes and the high compressor stator vanes. The term "stability bleed schedules", as used herein, may refer to the positioning of the bleed valves between the compressors. Both the inlet guide vane angles and the stability bleed valves may be scheduled or adjusted as a function of corrected compressor speed in a way to manage compressor stability margin.

Based at least in part on the received signals, the inner loop control module 64 determines a fuel flow (WF), inlet guide vane (IGV) schedules, and stability bleed (BLD) schedules of the gas generator section 22 that will deliver the power turbine torque request (Qpt_req) generated by the outer loop control module 62. In so doing, the inner loop control module 62 manages multi-variable controls of the gas generator section 22 to quickly respond to power demand changes. A fuel flow signal (WF) indicative of the determined fuel flow, an inlet guide vane signal (IGV) indicative of the determined inlet guide vane schedules, and a stability bleed signal (BLD) indicative of the determined stability bleed schedules are sent from the inner loop control module 64 to the gas generator section 22 of the gas turbine engine 20. The fuel flow, inlet guide vane positions, and stability bleed valves of the gas generator section 22 are then adjusted according to the signals received from the inner loop control module 64.

Figure 5:
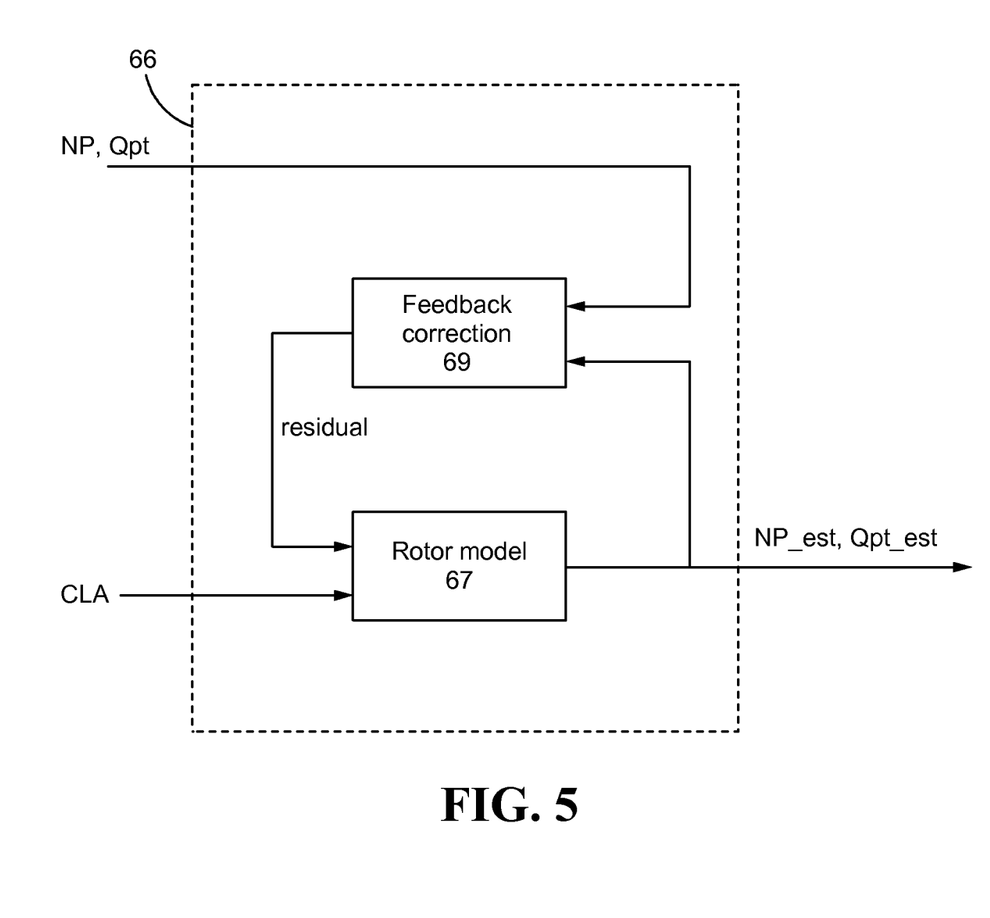
FIG. 5 is a schematic representation of a load estimation module for the control system of FIG. 2.

In order to generate the fuel flow (WF), inlet guide vane schedules (IGV), and stability bleed schedules (BLD), the inner loop control module 64 employs inversion of a dynamic model. For example, as shown in FIG. 5, the inner loop control module 64 may include a gas generator model 74, an optimization formulator 76, and a constrained optimization solver 78. The gas generator model 74 may model dynamic behavior of the gas generator. The gas generator model 74 may be a linear or nonlinear (e.g., differential algebraic equations, possibly in numerical simulation form), physics and data-based model based at least in part on the estimated power turbine speed (NP_est) and operational inputs. The operational inputs may include, but not be limited to an altitude of the airframe (ambient pressure over standard day pressure) and a low rotor corrected speed.

Optimization formulator 76 may receive model data from the gas generator model 74, as well as the power turbine torque request (Qpt_req). Based on those inputs, optimization formulator 76 may formulate an optimization problem for which optimization software will be able to solve as a numerically iterative process in real-time. Constrained optimization solver 78 may receive optimization data from the optimization formulator 76 in order to generate the requested fuel flow, inlet guide vane schedules, and stability bleed schedules (WF, IGV & BLD request). Constrained optimization solver 78 may be a numerical iteration tool which finds a solution to the optimization problem formulated by optimization formulator 76. In addition, constrained optimization solver 72 may be constrained to limits of the gas turbine engine 20, such as, without limitation, a rotor speed limit, a compressor stall limit, a lean blowout limit, a temperature limit, a pressure limit, or the like. Real-time implementation of the constrained, inverted dynamic gas generator model 74 into the inner loop control module 64 generates values for fuel flow, inlet guide vane schedules, and stability bleed schedules that deliver a torque of the power turbine section 24 that is proximate or equal to the torque request (Qpt_req) and within the limits of the gas turbine engine 20.

Referring now to FIG. 5, the load estimation module 66 may generate the estimated power turbine speed signal (NP_est) and the estimated power turbine torque signal (Qpt_est) by combining real-time speed sensor and torque sensor measurements (NP, Qpt) with dynamic model estimation. More specifically, the load estimation module 66 may include a rotor model 67 and feedback correction module 69. The rotor model 67 may be similar to, or the same as, the rotor model 68 of the outer loop control module 62, and may send the estimated speed and torque signals (NP_est, Qpt_est) to the feedback correction module 69.

The feedback correction module 69 may compare the speed sensor signal (NP) to the estimated speed signal (NP_est) from the rotor model 67 in order to determine a difference between the two signals (residual). The feedback correction module 69 may also compare the torque sensor signal (Qpt) to the estimated torque signal (Qpt_est) from the rotor model 67 in order to determine a difference between the two signals (residual). The difference between the signals from the sensor measurements and the estimated signals (residual) is then sent to the rotor model 67 in order to dynamically update the rotor model 67 for real-time implementation. Furthermore, the signal processing of real-time speed sensor and torque sensor measurements (NP, Qpt) may include sensor fault detection, isolation and accommodation (FDIA) techniques.

Figure 6:
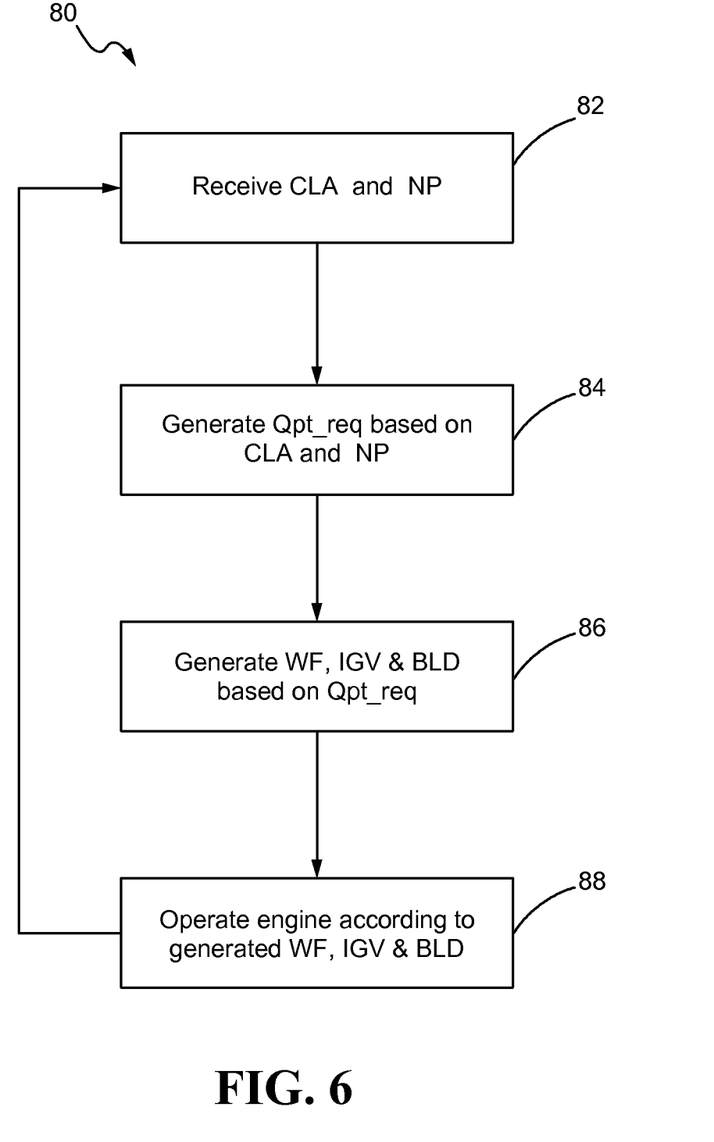
FIG. 6 is a flowchart illustrating an exemplary process for controlling a gas turbine engine, according to another embodiment of the present disclosure.

Turning now to FIG. 6, with continued reference to FIGS. 1-5, an exemplary process 80 for controlling the gas turbine engine 20. At block 82, the control system 60 (or computer processor) may receive the real-time collective lever angle (CLA) command and the real-time power turbine speed (NP) signal. The outer loop control module 62 of the control system 60 generates the torque request (Qpt_req) based at least in part on the real-time collective lever angle (CLA) command and the real-time power turbine speed (NP) signal, at block 84. At block 86, the inner loop control module 64 of the control system 60 generates the fuel flow (WF), the inlet guide vane (IGV), and the stability bleed (BLD) signals based at least in part on the generated torque request (Qpt_req) by the outer loop control module 62. The gas turbine engine 20 is operated according to the generated fuel flow (WF), inlet guide vane (IGV), and stability bleed (BLD) signals. More specifically, the inner loop control module 64 sends the fuel flow, inlet guide vane, and stability bleed signals to the gas generator section 22 of the gas turbine engine 20 in order to control the torque output of the power turbine section 24.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The described disclosure provides a cascaded architecture of a multi-variable control system for a gas turbine engine (e.g., turboshaft engine). The disclosed control system and method allow for the gas turbine engine to promptly deliver a requested change in power demand during flight maneuvers, while at the same time, minimizing power turbine speed excursion caused by a rotor load at various power levels. The disclosed system and method coordinate multi-variable controls, i.e., fuel flow and ingle guide vane schedules, in order to meet the power demand under engine operation limits.

The cascaded architecture of the disclosed control system includes an outer loop control module for power turbine control and an inner loop control module for gas generator control. Based on a collective lever angle command from a pilot of the aircraft, the outer loop control module utilizes a real-time implementation of a dynamic model for rotor load in order to calculate a power turbine torque request, thereby minimizing the power turbine seed excursion. In order to minimize error between the calculated power turbine torque request and an estimated real-time power turbine torque, the inner loop control module utilizes a real-time implementation of a dynamic model for the gas generator to regulate both fuel flow and inlet guide vanes of the gas turbine engine.

By using the control system and method disclosed herein, rotor speed excursion is reduced during quick changes in load or power demand, thereby providing improved flight handling quality at various power levels. In addition, more consistent compressor stall/surge protection is provided due to the limits or constraints incorporated into the inner loop control module. Furthermore, as applied to a turboshaft engine, the multi-variable control system with cascaded architecture affords smoother transients between autorotation and recovery. Moreover, the disclosed system and method provides improved integration with different airframes in load changes.

While the foregoing detailed description has been given and provided with respect to certain specific embodiments, it is to be understood that the scope of the disclosure should not be limited to such embodiments, and that the same are provided simply for enablement and best mode purposes. The breadth and spirit of the present disclosure is broader than the embodiments specifically disclosed and encompassed within the claims appended hereto.

What is claimed is:

1. A control system for a gas turbine engine, comprising:
   a computer processor;
   an outer loop control module programmed into the computer processor configured to determine a torque request that is a torque value, based at least in part on a real-time collective lever angle command and a real-time power turbine speed; and
   an inner loop control module programmed into the computer processor configured to receive the torque request from the outer loop control module, to determine fuel flow and inlet guide vane schedules based at least in part on the received torque request, and to command a gas generator of the gas turbine engine to control the gas generator according to the determined fuel flow and inlet guide vane schedules.

2. The control system of claim 1, further comprising a load estimation module in communication with the outer loop control module, the inner loop control module, and the gas turbine engine, the load estimation module programmed to estimate the real-time power turbine speed and a real-time power turbine torque.

3. The control system of claim 2, wherein the outer loop control module determines the torque request based at least in part on a desired power turbine speed.

4. The control system of claim 2, wherein the inner loop control module determines the fuel flow and inlet guide vane schedules based at least in part on the real-time power turbine speed.

5. The control system of claim 1, wherein the outer loop control module determines the torque request based at least in part on operational inputs.

6. The control system of claim 1, wherein the outer loop control module includes inversion of a dynamic model of a rotor.

7. The control system of claim 1, wherein the inner loop control module determines stability bleed schedules based at least in part on the received torque request, and commands the gas generator of the gas turbine engine to control the gas generator according to the determined stability bleed schedules.

8. The control system of claim 1, wherein the inner loop control module includes inversion of a dynamic gas generator model.

9. The control system of claim 8, wherein the dynamic gas generator model of the inner loop control module is constrained to limits of the gas turbine engine.

10. The control system of claim 9, wherein the inner loop control module determines the fuel flow and inlet guide vane schedules based at least in part on operational inputs.

11. The control system of claim 1, wherein the wherein the inner loop control module determines a difference between the torque request and an estimated torque in order to control the gas generator.

12. The control system of claim 2, wherein the wherein the load estimation module estimates the real-time power turbine torque based at least on a torque sensor measurement.

13. A method for controlling a gas turbine engine, comprising:
a computer processor receiving a real-time collective lever angle command and a real-time power turbine speed;
the computer processor generating a torque request that is a torque value, based at least in part on the real-time collective lever angle command and the real-time power turbine speed;
the computer processor generating a fuel flow command and an inlet guide vane command based at least in part on the generated torque request; and
the computer processor commanding a gas generator of the gas turbine engine according to the fuel flow command and the inlet guide vane command to control a power turbine torque of the gas turbine engine.

14. The method of claim 13, further comprising a sensor detecting the real-time power turbine speed, and sending the real-time power turbine speed to the computer processor.

15. The method of claim 13, further comprising a sensor detecting a real-time power turbine torque, and sending the real-time power turbine torque to the computer processor.

16. The method of claim 13, further comprising the computer processor generating a stability bleed command based at least in part on the generated torque request and commanding the gas generator according to the stability bleed command to control the power turbine torque of the gas turbine engine.

17. The method of claim 13, further comprising the computer processor using inversion of a dynamic model of a rotor to generate the torque request, and the computer processor using inversion of a dynamic gas generator model to generate the fuel flow command and the inlet guide vane command.

18. A turboshaft engine, comprising:
a gas generator section;
a power turbine section downstream of the gas generator section; and
a control system in communication with the gas generator section and the power turbine section, the control system including at least one computer processor configured to:
receive a collective lever angle command and a power turbine speed,
generate a torque request that is a torque value, based at least in part on the collective lever angle command and the power turbine speed,
generate a fuel flow command and an inlet guide vane command based at least in part on the generated torque request, and
command the gas generator section according to the fuel flow command and the inlet guide vane command in order to control a torque of the power turbine section.

19. The turbo shaft engine of claim 18, wherein the computer processor is configured according to a cascaded architecture.

20. The turboshaft engine of claim 19, wherein the cascaded architecture includes an outer loop control module to generate the torque request and an inner loop control module to generate the fuel flow command and the inlet guide vane command.

21. The turboshaft engine of claim 20, wherein the outer loop control module uses dynamic inversion of a rotor model to generate the torque request, and wherein the inner loop control module uses dynamic inversion of a gas generator model to generate the fuel flow command and the inlet guide vane command.

22. The turboshaft engine of claim 18, wherein the computer processor is further configured to generate a stability bleed command based at least in part on the generated torque request, and to command the gas generator section according to the stability bleed command in order to control the torque of the power turbine section.

* * * * *